July 19, 1927.  
S. LOEWENHERZ  
1,636,475

MACHINE FOR DRILLING DRAWING DIES OR STONES

Filed Aug. 20, 1925

Inventor  
Siegmund Loewenherz  
By Henry Orth Jr  
atty

Patented July 19, 1927.

1,636,475

UNITED STATES PATENT OFFICE.

SIEGMUND LOEWENHERZ, OF BERLIN, GERMANY, ASSIGNOR TO PATENT-TREUHAND-GESELLSCHAFT FÜR ELEKTRISCHE GLÜHLAMPEN M. B. H., OF BERLIN, GERMANY, A CORPORATION OF GERMANY.

MACHINE FOR DRILLING DRAWING DIES OR STONES.

Application filed August 20, 1925, Serial No. 51,433, and in Germany September 10, 1924.

This invention relates to a machine for boring or drilling drawing dies or discs, in particular diamond drawing dies, in which a rod-like holder adapted to be reciprocated and carrying the work, e. g. the stone, is retracted mechanically at short intervals of time from a rotating drill and is pressed by spring pressure again into contact with the drill.

In such machines hitherto it has been necessary at very short intervals of time, say every 15 to 30 minutes, to see that the drill is replaced or reset, as owing to wear occurring there is the liability of the hole to be bored being widened by the thicker part or shaft of the drill.

The invention has for its object to avoid the necessity for continuous attention to the boring operation by the attendant as regards watching for wear of the tool. and accordingly of avoiding the dangers of such continuous inspection. For this purpose, in accordance with the invention, a limit is set to the extent of the feed movement of the work holder required dependent upon the permissible wear of the drill and the increase in depth of the hole by a stop adjustably arranged in the path of movement of the work holder. This stop is adjusted before the machine is started, and after the work holder takes up contacting position with the drill, by the amount of the permissible wear of the drill from the projecting part of its holder, so that immediately on wear of the drill occurring, or shortly before such amount of wear occurs, the stop strikes the projecting part of the holder, preventing further feed movement of the work holder. Even should the operator not notice in due time that the drill has worn, no widening of the hole being drilled will occur.

In order that the operator may be automatically notified of contact occurring and of the drill having become worn, both this stop and the work holder or a second stop mounted thereon are interposed in an electric circuit which is closed on contact between the stops occurring and operates one or more signalling devices, lamps, bells, drop signals or the like, attracting the attention of the operator. Also, by the closure of the electric circuit the mechanism effecting the withdrawal of the drill may also be started and, if desired, also the drill may be stopped, so that when contact between the stops occurs all movement of the work and of the drill ceases.

Figure 1:
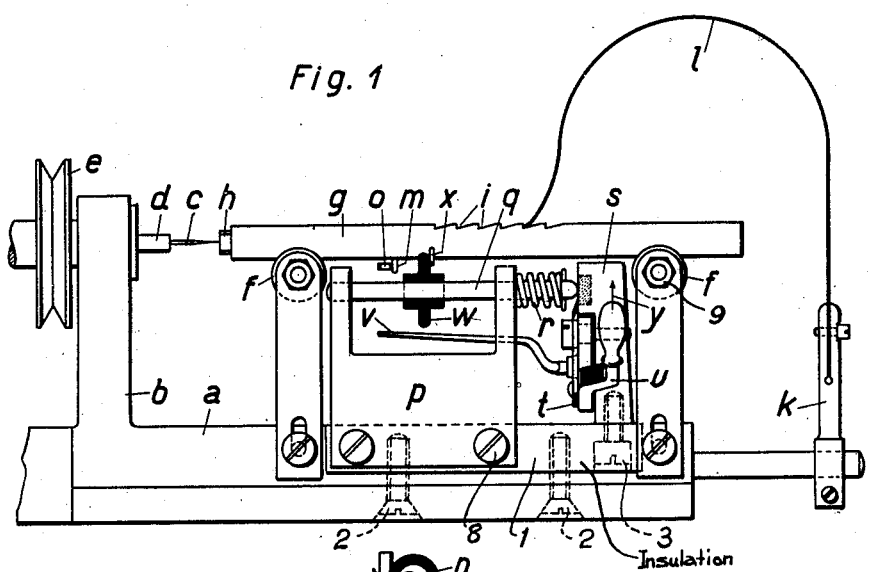
Figure 2:
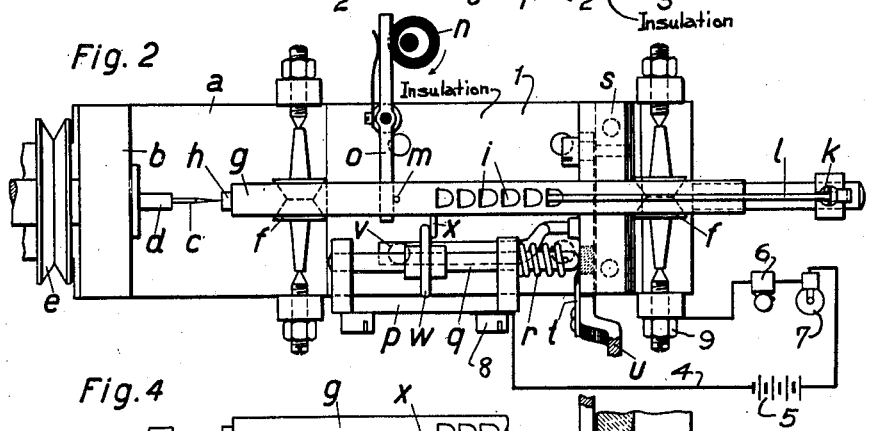
Figure 4:
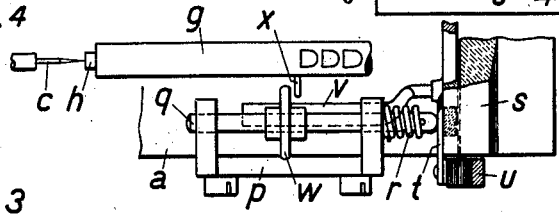
Figures 3, 5:
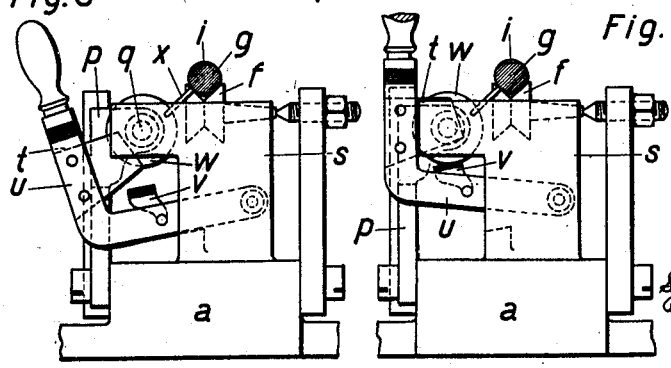

A machine in accordance with the invention is illustrated by way of example in the accompanying drawing in Fig. 1 in elevation and in Fig. 2 in plan. In Fig. 3 is an end view and Figs. 4 and 5 are plan and an end view respectively of details of the machine in other positions.

As shown, on the machine frame $a$ is mounted in a bearing $b$, a spindle $d$ carrying the drill $c$, which spindle $d$ is set in rotation by the belt pulley $e$. Axially of the drill $c$ is mounted adjustably on rollers $f$ a rod $g$ to the forward left hand end of which the die or the stone $h$ to be drilled is soldered in the usual manner. The rod-like work holder $g$ is provided on its upper side with notches $i$ in which engages a blade spring $l$ secured to an adjustable holder $k$. The spring $l$ tends to press the work holder and thus the die or stone forward into contact with the drill $c$. On the lower side of the holder $g$ is secured a pin $m$ against which bears one arm of a rock-lever $o$ operable by a rotary cam $n$. By means of this cam the holder $g$ and thus the stone $h$ is retracted from the drill $c$ against the action of the spring $l$ at definite uniform time intervals. A to and fro motion in relation to the rotating drill is thus imparted to the work or stone by the spring $l$ and by the cam $n$. Due to the contact of the work holder with the point of the drill in conjunction with the continuously exerted friction, the drill point is worn to a definite extent in a short time. To this wear corresponds a definite advance of the work holder under the action of the spring. This much of the mechanism is well known and has been described to enable a clear understanding of my invention.

Parallel to the rod-like work holder $g$ is a small bracket $p$ secured to a block of insulating material 1, held to the frame $a$ by screws 2. In this bracket is adjustably mounted the rod $q$ which is held pressed by the spring with its right hand end in contact with a stop plate $s$ held in the insulating plate 1 by screws 3. Between the end of the rod and the stop plate $s$ is adapted to be inserted a plate $t$ secured to a rotatable lever $u$. To the latter is secured a rod $v$ which on rotation of the lever $u$ is pressed against the lower side of the ring w, which is adjustable on the rod q, which ring co-operates with the projection x on the work holder g.

When the machine is to be used the work is pressed against the still stationary drill c by inserting the blade spring l in one of the notches i on the work holder, and thereupon the contact ring w is adjusted on the rod q as shown in Figs. 1 to 3 in such manner that it bears against the stop x on the work holder g. The lever u is then turned in the direction of the arrow y whereupon the plate t secured thereto is inserted between the spring pressed end of the rod q and the stop plate s and the rod q with the ring w thereon is displaced to the left an amount corresponding to the thickness of the plate t. As such thickness corresponds to the maximum allowable wear of the drill, on insertion of the plate t the ring w is moved away from the stop x by an amount corresponding to such maximum allowable wear. In this position the ring w is held firmly by the clamping rod v, which is raised on rotation of the lever u. The machine may now be set in motion by engaging the drill c and the device for positively retracting the work holder. As the drill becomes worn the distance between the two stops w and x becomes less until after a definite interval of time, i. e., when the maximum allowable wear of the drill has taken place the two stops w and x come in contact. No further movement of the work holder can take place so that even should the attendant omit to observe that the two stops had come in contact no further wear of the drill liable to cause damage would occur.

Preferably the two stops w and x serve also as contacts of an electric circuit in which one or more signal devices (lamps, bells, drop signals or the like) are inserted. In such circumstances on the two stops contacting the attention of the attendant is automatically obtained by the signal or signals.

Connected to the bracket p, (for example by one of the screws 8 that connect this bracket to the insulating block 1,) is one end of a normally open electric circuit 4, the other end of which is connected to a non-insulated part of the machine, conveniently to one of the bearing pins for one of the rollers f at 9. This circuit contains a source of current 5, an audible signal as a bell, 6, and a visible signal, for example a lamp 7. The arrangement is such that when pin x contacts with wheel w the circuit is closed and the signals operated.

The invention is not limited to the details described. For example, in lieu of the arrangement shown in the drawing a movable and adjustable stop may be provided on the work holder g and a fixed stop on the rod q which will then be stationary. In lieu of adjusting and securing in adjusted position one stop, both stops may be adjustable. The adjustment and the securing in adjusted position of the stop or stops may be effected in any other way, for instance by means of a screw threaded spindle drive. The retraction of the work holder may be effected by any other convenient means instead of by a cam as shown. The distance piece t is preferably detachably secured to the lever u so that according to the fineness of the drill point and the length of point required blades t of different thickness may be employed.

I claim:

1. In a machine for drilling precious stones and particularly diamond drawing dies, a non-feeding rotary drill holder, an alined work holder longitudinally reciprocated, a spring urging the work holder and work against the drill, means for retracting the holder in rapid succession against the action of said spring, a stop on the holder, a rod arranged parallel to the work holder and a stop on the rod co-operating with the stop on the holder, one of which stops is adjustable and determines the limit of feed of the holder.

2. In a machine for drilling precious stone and particularly diamond drawing dies, a non-feeding rotary drill holder, an alined work holder, a spring urging the work holder and work against the drill, means for retracting the holder in quick succession against the action of said spring, a rod arranged parallel to the holder, a wheel adjustable along said rod and a stop on the holder arranged to strike the wheel, the adjustable distance between the said stop and wheel being less than the stroke of the holder as determined by said cam.

3. A machine for drilling drawing dies or stones and in particular diamond dies, including a drill, a work holder adapted to be moved to and fro relatively to said drill and means for limiting the forward movement of the work holder, said means including a rod disposed adjacent the work holder, a stop adjustably mounted on said rod and a co-operating stop mounted on said work holder and means for positioning said rod and consequently said first mentioned stop including a stop plate normally engaged by said rod and a distance piece adapted to be inserted between the rod and the said stop plate substantially as and for the purpose set forth.

4. A machine for drilling drawing dies or stones and in particular diamond dies, including a drill, a work holder adapted to be moved to and fro relatively to said drill and means for limiting the forward movement of the work holder, said means including a rod disposed adjacent the work holder a stop adjustably mounted on said rod and a stop on said work holder, and means for positioning said rod and consequently said first mentioned stop including a stop plate normally engaged by said rod, a lever arm and a distance piece detachably secured to said lever arm and adapted to be interposed between said rod and said stop plate by movement of said lever arm.

5. A machine for drilling drawing dies or stones and in particular diamond dies, including a drill, a work holder adapted to be moved to and fro relatively to said drill and means for limiting the forward movement of the work holder, said means including a rod disposed adjacent the work holder a stop adjustably mounted on said rod and a stop on said work holder, and means for positioning said rod and consequently said first mentioned stop including a stop plate normally engaged by said rod, a lever arm and a distance piece detachably secured to said lever arm and adapted to be interposed between said rod and said stop plate by movement of said lever arm, said lever arm also fitted with means to clamp said first mentioned stop on said rod.

6. A machine for drilling drawing dies or stones and in particular diamond dies, including a drill, a work holder adapted to be moved to and fro relatively to said drill and means for limiting the forward movement of the work holder, said means including two relatively adjustable stops one of said stops being mounted on the work holder and the other on a stationary part of the machine but in the path of the first mentioned stop so that on wear of the drill occurring the stops come in contact, said stops being interposed in an electric circuit and on contact occurring closing such circuit and signal devices adapted for actuation on closure of such circuit.

7. A machine for drilling precious stones, particularly diamond drawing dies, comprising a rotating drill holder, an alined work holder and means for continuously reciprocating the work holder, in combination with a stop on the work holder and a second relatively stationary stop to be engaged thereby, movable supporting means for the second stop and a gauge plate corresponding in thickness to the permissible wear of the drill and pivotally arranged to be inserted between said supporting means and a stationary portion of the machine after said stops have been set in contact preparatory to starting the drilling operation.

In testimony that I claim the foregoing as my invention, I have signed my name.

SIEGMUND LOEWENHERZ.